US 8,045,707 B2

(12) United States Patent
Rodgers et al.

(10) Patent No.: US 8,045,707 B2
(45) Date of Patent: Oct. 25, 2011

(54) SYSTEM AND METHOD FOR SECURING DATA

(75) Inventors: Steve W. Rodgers, San Diego, CA (US); Sherman (Xuemin) Chen, San Diego, CA (US); Iue-Shuenn Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1533 days.

(21) Appl. No.: 10/695,008

(22) Filed: Oct. 28, 2003

(65) Prior Publication Data

US 2005/0039030 A1   Feb. 17, 2005

Related U.S. Application Data

(60) Provisional application No. 60/495,313, filed on Aug. 15, 2003.

(51) Int. Cl.
*H04L 9/00* (2006.01)

(52) U.S. Cl. ......................................................... 380/43
(58) Field of Classification Search ............ 380/57; 713/189, 190; 726/4
See application file for complete search history.

(56) References Cited

U.S. PATENT DOCUMENTS

| 4,004,089 | A | * | 1/1977 | Richard et al. ............. 380/46 |
| 5,381,480 | A | * | 1/1995 | Butter et al. ............... 380/37 |
| 5,835,600 | A | * | 11/1998 | Rivest ........................ 380/44 |
| 6,826,663 | B2 | * | 11/2004 | Perego et al. ............. 711/156 |
| 7,284,133 | B2 | * | 10/2007 | Watanabe et al. ......... 713/189 |
| 2001/0038693 | A1 | * | 11/2001 | Luyster .................... 380/37 |
| 2002/0101985 | A1 | | 8/2002 | Verplanken et al. |
| 2004/0039922 | A1 | * | 2/2004 | Zaabab ..................... 713/189 |
| 2005/0010527 | A1 | * | 1/2005 | Rarick et al. .............. 705/50 |
| 2005/0015558 | A1 | * | 1/2005 | Evans et al. ............... 711/154 |

OTHER PUBLICATIONS

Menezes, Vanstone, Oorschot: "Handbook of Applied Cryptography", 1997, CRC Press LLC, USA, pp. 250-256; XP002308629.
Bruce Schneier: "Applied Cryptography, Second Edition", 1996, John Wiley & Sons, USA, pp. 270-272, 288, 308. XP002308630.

* cited by examiner

*Primary Examiner* — Nasser Moazzami
*Assistant Examiner* — Daniel Hoang
(74) *Attorney, Agent, or Firm* — McAndrews, Held & Malloy, Ltd.

(57) ABSTRACT

Systems and systems that protect data are provided. In one embodiment, a system may include, for example, a memory and a processor. The memory may store, for example, encrypted data. The processor may be coupled to the memory and may include, for example, a decryptor that decrypts the encrypted data. The decryptor may be adapted, for example, to variably bit roll the encrypted data, to fixedly bit shuffle the bit-rolled data, to add a first key to the bit-shuffled data and to process the added data with a second key.

40 Claims, 4 Drawing Sheets

SYSTEM AND METHOD FOR SECURING DATA

CROSS REFERENCE TO RELATED APPLICATIONS

This application makes reference to, claims priority to and claims benefit from U.S. Provisional Patent Application Ser. No. 60/495,313, entitled "Security Protection for Microprocessor Instructions Using a Single Pipeline Stage Encryption/Decryption Algorithm on a Set-Top-Box (STB) Chip" and filed on Aug. 15, 2003.

INCORPORATION BY REFERENCE

The above-referenced United States patent application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Integrated circuits may be subject to different types of security attacks. For example, integrated circuits used for decoding and displaying digital television signals such as, for example, set-top box (STB) chips may be hacked by users seeking to access, for free, subscription-services or pay-for-service programming for television. In addition to viewing the programming without paying, successful hackers may be able to distribute "in-the-clear" video content to others.

A hacker may attempt to target different elements of a system. For example, a hacker may target a software component of an STB chip. If software developed by the hacker can be downloaded onto the STB chip, then on-chip security may be overridden in a variety of ways. In response to such attacks, some STB chips may perform a one-time integrity check on a software code set to ensure, for example, that the software originated from an authorized or recognized source. However, a one-time software integrity check may be open to attacks that may occur after the one-time integrity check has been completed.

Some STB chips may encrypt software instructions in a flash memory or a synchronous dynamic random access memory (SDRAM) memory using data encryption standard (DES) encryption or triple DES (3DES) encryption. By using a DES or 3DES encryption key known only to an authorized entity and the STB, the STB can be assured, with a high degree of confidence, that only microprocessor instructions from an authorized source can be decoded properly. Instruction encryption using DES or 3DES may also protect the code base from examination for clues relating to internal chip operation, even if the flash memory is removed from the board and examined separately. However, DES decryption or 3DES decryption of microprocessor instructions may suffer from, for example, latencies induced in a pipeline to a microprocessor. Pipeline latencies may substantially reduce throughput.

Further limitations and disadvantages of conventional and traditional approaches will become apparent to one of ordinary skill in the art through comparison of such systems with one or more aspects of the present invention as set forth in the remainder of the present application with reference to the drawings.

BRIEF SUMMARY OF THE INVENTION

Aspects of the present invention may be found in, for example, systems and methods that secure data.

In one embodiment, aspects of the present invention may provide a system that protects data. The system may include, for example, a memory and a processor. The memory may store, for example, encrypted data. The processor may be coupled to the memory and may include, for example, a decryptor that decrypts the encrypted data. The decryptor may be adapted, for example, to variably bit roll the encrypted data, to fixedly bit shuffle the bit-rolled data, to add a first key to the bit-shuffled data and to process the added data with a second key.

In another embodiment, aspects of the present invention may provide a system that protects data. The system may include, for example, a memory and a processor. The memory may store, for example, encrypted data. The processor may be coupled to the memory and may include, for example, a decryptor that decrypts the encrypted data without adding a latency to a processor pipeline.

In another embodiment, aspects of the present invention may provide a system that protects data. The system may include, for example, a memory and a processor. The memory may store, for example, encrypted data. The processor may be coupled to the memory and may include, for example, a decryptor that decrypts the encrypted data without adding enough gate delays to exceed a clock cycle budget of the processor.

In another embodiment, aspects of the present invention may provide a system that protects data. The system may include, for example, a memory and a processor. The memory may store, for example, encrypted data. The processor may be coupled to the memory and may include, for example, a decryptor that decrypts the encrypted data and decrypts a word of the encrypted data in a single cycle.

In another embodiment, aspects of the present invention may provide a system that secures data. The system may include, for example, a processor that may decrypt encrypted data. The processor may be adapted, for example, to variably bit roll encrypted data and to fixedly bit shuffle the bit-rolled data.

In yet another embodiment, aspects of the present invention may provide a method that secures processor instructions. The method may include, for example, one or more of the following: variably rolling data information based on a first key and an address related to the data information; and hard-coded shuffling of the rolled data information; using one or more keys to process the data information.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
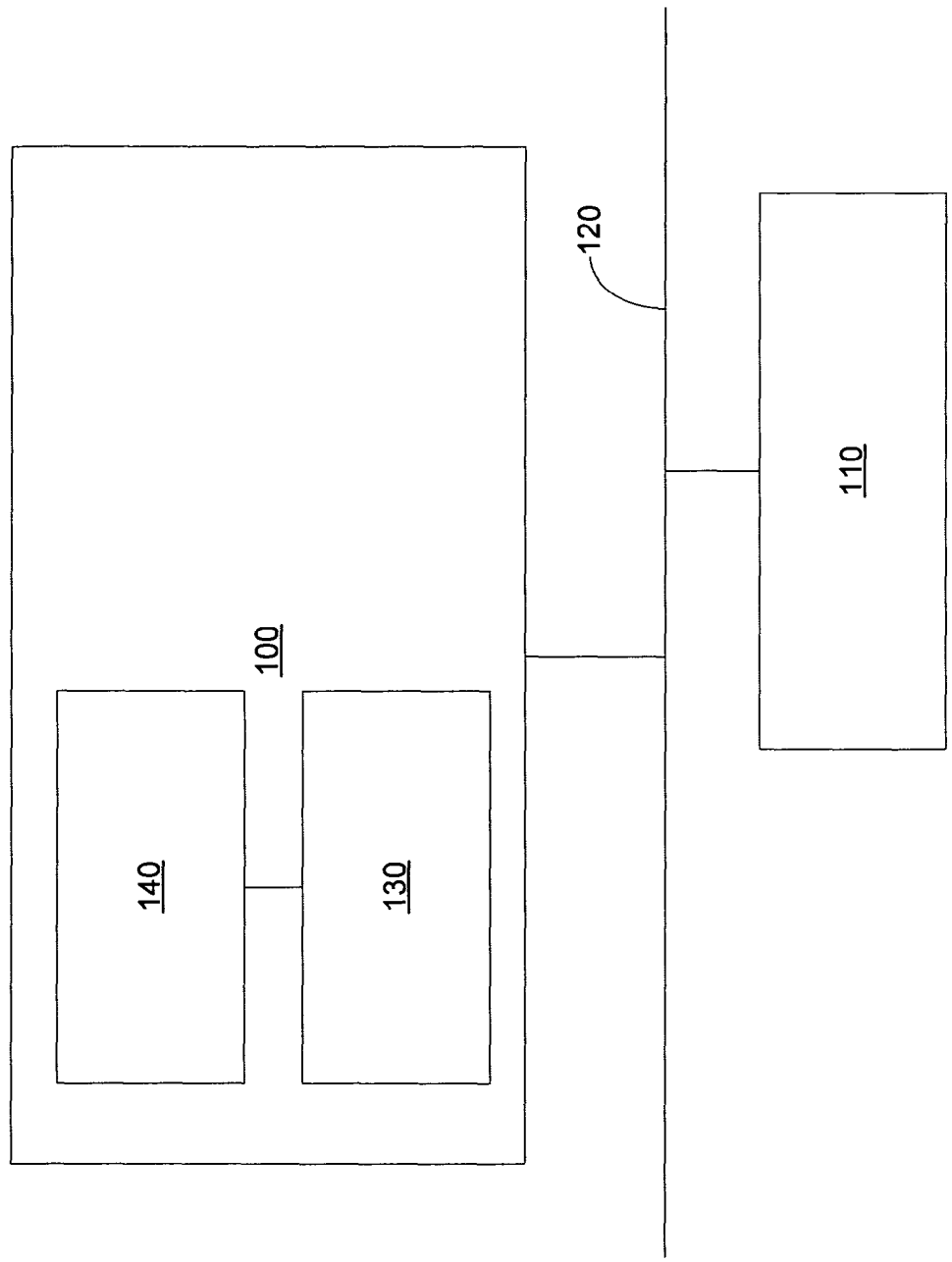
FIG. 1 shows a block diagram illustrating an embodiment of a system that protects data according to the present invention.

Some embodiments according to the present invention may be related to, for example, systems and methods that protect data. At least one embodiment according to the present invention may be related to, for example, systems and methods that secure computer instructions (e.g., microprocessor instructions). At least one embodiment according to the present invention may be related to, for example, systems and methods that protect software instructions. Some embodiments according to the present invention may employ, for example, a pipeline stage encryption or decryption algorithm (e.g., a single pipeline stage encryption or decryption algorithm). Some embodiments according to the present invention may be used with integrated circuits such as, for example, integrated circuits adapted to decode and to display digital television signals. In at least one embodiment according to the present invention, the integrated circuits may be part of a set top box (STB) or one or more STB chips.

An encryption or decryption scheme (e.g., a single cycle encryption or decryption scheme) for software instructions according to some embodiments of the present invention may include, for example, one or more of the characteristics as set forth below.

The encryption or decryption scheme may add as few gate delays as possible. Fewer gate delays may allow a single cycle encryption or decryption scheme to be merged with existing logic in a pipeline without exceeding a particular clock cycle budget. By keeping within a particular clock cycle budget, additional latencies might not be added to the pipeline.

The encryption or decryption scheme may include, for example, varying elements. For example, some elements may vary periodically such as, for example, at address multiples (e.g., after a particular number of addresses). Periodic variations may enhance security, for example, by changing at least some of the parameters of the encryption or decryption scheme. Furthermore, repeated instructions might not be encoded in the same way each time, thereby thwarting efforts by a hacker to deduce particular portions of the original unencrypted code set.

The encryption or decryption scheme may include, for example, address regions (e.g., multiple address regions) that may be associated with different encryption or decryption algorithms. Encryption or decryption algorithms that change from address region to address region may enhance security, for example, by denying a hacker any insights with respect to an encryption or decryption algorithm by analyzing known instructions in particular address locations such as, for example, jump instructions in a lower address space.

The encryption or decryption scheme may enhance security. For example, some embodiments according to the present invention may be adapted to reduce the risk of deducing an encryption key, a decryption key or an underlying algorithm.

In some embodiments, the present invention may provide a balance between, for example, simplifying an algorithm or logic and obscuring contents (e.g., memory contents) as much as possible. Accordingly, some embodiments according to the present invention may weigh some characteristics in light of other characteristics and may favor some characteristics over other characteristics.

FIG. 1 shows a block diagram illustrating an embodiment of a system that protects data according to the present invention. As illustrated, a processor 100 is coupled to a memory 110 via a bus 120. The processor 100 may include, for example, a decryption block 130 and an internal memory 140. The processor 100 may be, for example, a central processing unit (CPU), a microprocessor or any other computing device. The decryption block 130 may be adapted, for example, to decrypt data from the memory 110. The internal memory 140 may be, for example, an internal cache and may buffer the decrypted data. The memory 110 may be, for example, a flash memory or a random access memory (RAM) such as, for example, a synchronous dynamic RAM (SDRAM). The memory 110 may store, for example, encrypted data such as, for example, encrypted instructions.

The processor 100 or the memory 110 may be part of a set-top box according to some embodiments of the present invention. The processor 100 may be part of a set-top box integrated circuit (e.g., a set-top box chip). The processor 100 and the memory 110 may be mounted on a circuit board housed by a set-top box. The memory 110 may also be external to or coupled to a set-top box.

In operation according to various embodiments of the present invention, at a head end such as, for example, a service provider, a content provider or a manufacturer may encrypt data before storing the data in the memory 110. Data that has been encrypted by an embodiment of an encryption scheme according to the present invention may be decrypted by an embodiment of a decryption scheme according to the present invention. In some embodiments, additional security measures may be taken. For example, if the memory 110 includes flash memory, but the processor instruction execution is out of SDRAM (e.g., for systems that move the flash memory instructions to SDRAM before beginning execution), then an additional compression step or an encryption step (e.g., a data encryption standard (DES) encryption step or a triple DES (3DES) encryption step) may be performed.

The processor 100 may request (e.g., fetch) a set of data (e.g., a set of instructions) from the memory 110 via the bus 120. Since the data is encrypted, the data may be processed by the decryption block 130, before the data may be stored in the internal cache 140 where the processor 100 may access the data.

Figure 2:
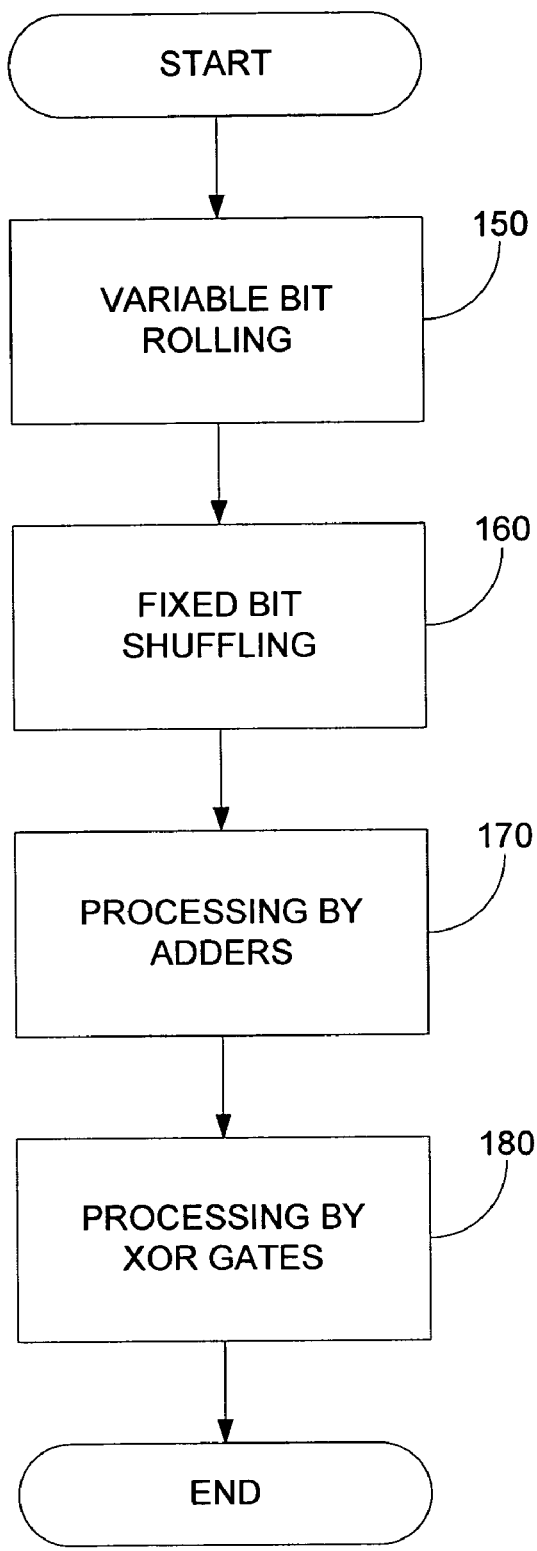
FIG. 2 shows a flow chart illustrating an embodiment of a method that protects data according to the present invention.

FIG. 2 shows a flow chart illustrating an embodiment of a method that decrypts encrypted data according to the present invention. In step 150, the decryption block 130 may perform variable bit rolling of the incoming data bits. The variability of the bit rolling may be related to, for example, a processing of a key and an address. In step 160, the decryption block 130 may perform a fixed bit shuffling of the incoming data bits. The fixed bit shuffling may be, for example, fixed, hard-coded bit shuffling. The hard-coded bit shuffling may differ, for example, for different devices (e.g., different classes of set-top boxes). In step 170, the decryption block 130 may perform processing by adders on the incoming data bits. The adders may be, for example, a series of two-bit adders. A value input into the adders may be related to, for example, a processing of a key and an address. In step 180, the decryption block 130 may perform processing by exclusive OR (XOR)

gates. A value input into the XOR gates may be related to, for example, a key (e.g., a hidden internal key).

Figure 3:
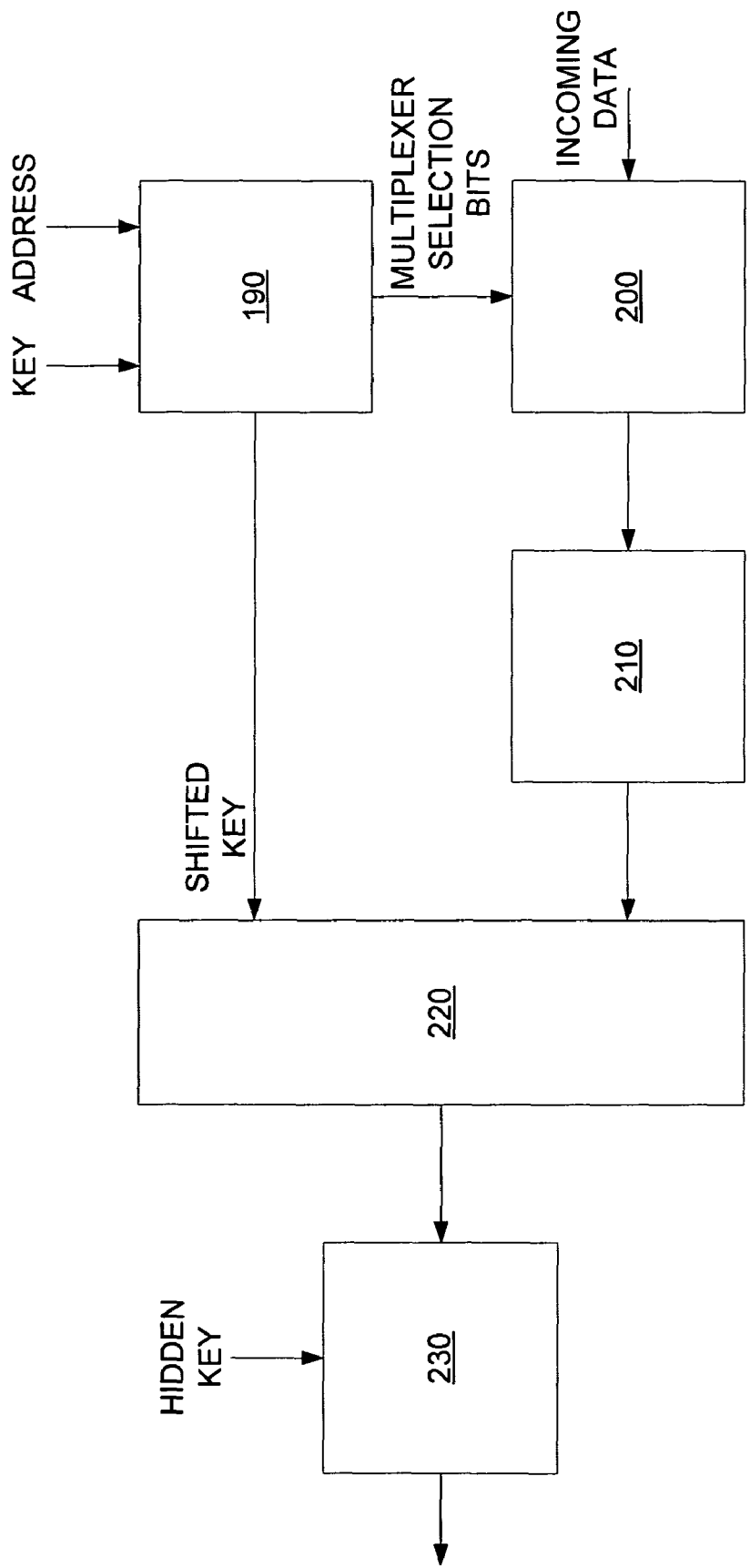
FIG. 3 shows a block diagram illustrating an embodiment of a decryption block according to the present invention.

FIG. 3 shows a block diagram illustrating a decryption block according to the present invention. A decryption block 130 may include, for example, a processor 190, a bit roller 200, a bit swapper 210 (e.g., a fixed bit swapper), an adder 220 and an XOR block 230. The processor 190 may be coupled to the bit roller 200 and to the adder 220. The bit roller 200 may be coupled to the bit swapper 210 which, in turn, may be coupled to the adder 220. The adder 200 may be coupled to the XOR block 230. The bit roller 200 may include, for example, a variable bit roller. The bit swapper 210 may include, for example, a fixed, hard-coded bit shuffler. The adder 220 may include, for example, a set of two-bit adders (e.g., 32 two-bit adders). The XOR block 230 may include, for example, a set of XOR gates.

be, for example, six roll regions. Each roll region may be characterized by, for example, a roll skip, a roll region length and a roll amount. These parameters may be set, for example, through bits within at least a portion of a key (e.g., a decryption/encryption key). The bits of the key that may be used to set the parameters may change. For example, the bits of the key that may be used to set the parameters may be based on a data address. The key may be shifted (e.g., periodically, after a particular number of data addresses) so that the roll parameter may be different for different addresses in the memory 110.

For a particular cycle, a mapping of a portion of a key may be set forth as shown below. For example, for two roll regions within a data set having six roll regions, for example, a set of the lower 12 bits of the key, K[11:0], may characterize the roll parameters of the first two roll regions.

| Roll Region 1 | | |
|---|---|---|
| K[1:0] | Roll_Skip_1 | {00 = start on first bit of Roll Region 1, ..., 11 = start on fourth bit of Roll Region 1} |
| K[3:2] | Roll_Length_1_5 | {00 = roll length of 5, ..., 11 = roll length of 8} |
| K[5:4] | Roll_Amount_1 | {00 = roll amount of 1, ..., 11 = roll amount of 4} |
| Roll Region 2 | | |
| K[7:6] | Roll_Skip_2 | {00 = start on first bit of Roll Region 2, ..., 11 = start on fourth bit of Roll Region 2} |
| K[9:8] | Roll_Length_1_5 | {00 = roll length of 5, ..., 11 = roll length of 8} |
| K[11:10] | Roll_Amount_1 | {00 = roll amount of 1, ..., 11 = roll amount of 4} |

In operation according to various embodiments of the present invention, a key and an address may be input into the processor 190. Based on, for example, a key and an address, the processor 190 may generate a shifted key and multiplexer selection bits. The shifted key may be sent to the adder 200. The multiplexer selection bits may be sent to the bit roller 200. The bit roller 200 may receive the incoming data, for example, the encrypted data from the memory 110. The bit roller 200 may then perform a bit rolling operation. A bit rolling operation may include, for example, rotating bits within particular roll regions of the incoming data based on, for example, the multiplexer selection bits. The rolled bits may then be sent to the bit swapper 210.

The bit swapper 210 may perform, for example, a fixed bit shuffling (e.g., a fixed, hard-coded bit shuffling) of the bit rolled data. The fixed bit shuffling may differ for different types or classes of chips or devices. The bit swapped data may then be sent to the adder 220. The adder 220 may then combine at least a portion of the shifted key with the bit swapped data using one or more adders (e.g., two-bit adders). The portion of the shifted key used by the adder 220 may change (e.g., shift) as different addresses are input into the processor 190. The output of the adder 220 may be sent to the XOR block 230. The XOR block 230 may then perform an XOR operation with the output of the adder 220 and a key (e.g., an internal key). The key (e.g., a hidden key) may be unrelated to the key used by the processor 190. The key may also be unique for a particular implementation or may be unique for particular versions of chips, for example. The output of the XOR block 230 may be, for example, decrypted data such as, for example, decrypted instructions for the processor 100. The decrypted data may then be stored in the memory 140 (e.g., an internal cache).

An embodiment of a method for bit rolling according to the present invention is provided. Bit rolling may refer to an ability to rotate bits within a particular roll region within a data set. For example, in a 64-bit data instruction, there may The mapping may continue up to, for example, six roll regions.

As an example, if the lower 12 bits of the key had a value of 0x476=010001110110, then for Roll Region 1 may have the following parameters: Roll_Skip_1=10, Roll_Length_1_5=01 and Roll_Amount_1=11. Thus, in Roll Region 1, the roll may begin at bit 2 (i.e., the roll may begin at the third bit of Roll Region 1), have a roll region length of six bits and a roll amount of four bits. In the example, Roll Region 2 may have the following parameters: Roll_Skip_2=01, Roll_Length_2_5=00 and Roll_Amount_2=01. Thus, in Roll Region 2, the roll may begin at bit 9 (i.e., the roll starts on the second bit of Roll Region 2), have a roll region length of five bits and a roll amount of two bits.

Thus, the roll parameters might have the following effect on incoming data:

| Incoming Data | After Bit Rolling |
|---|---|
| Bit 0 | Unchanged |
| Bit 1 | Unchanged |
| Bit 2 | Bit 6 |
| Bit 3 | Bit 7 |
| Bit 4 | Bit 2 |
| Bit 5 | Bit 3 |
| Bit 6 | Bit 4 |
| Bit 7 | Bit 5 (End of Roll Region 1) |
| Bit 8 | Unchanged |
| Bit 9 | Bit 11 |
| Bit 10 | Bit 12 |
| Bit 11 | Bit 13 |
| Bit 12 | Bit 9 |
| Bit 13 | Bit 10 (End of Roll Region 2) |

These roll parameter values may change the next time the key is shifted so that different instructions may have their bits swapped differently.

Figure 4:
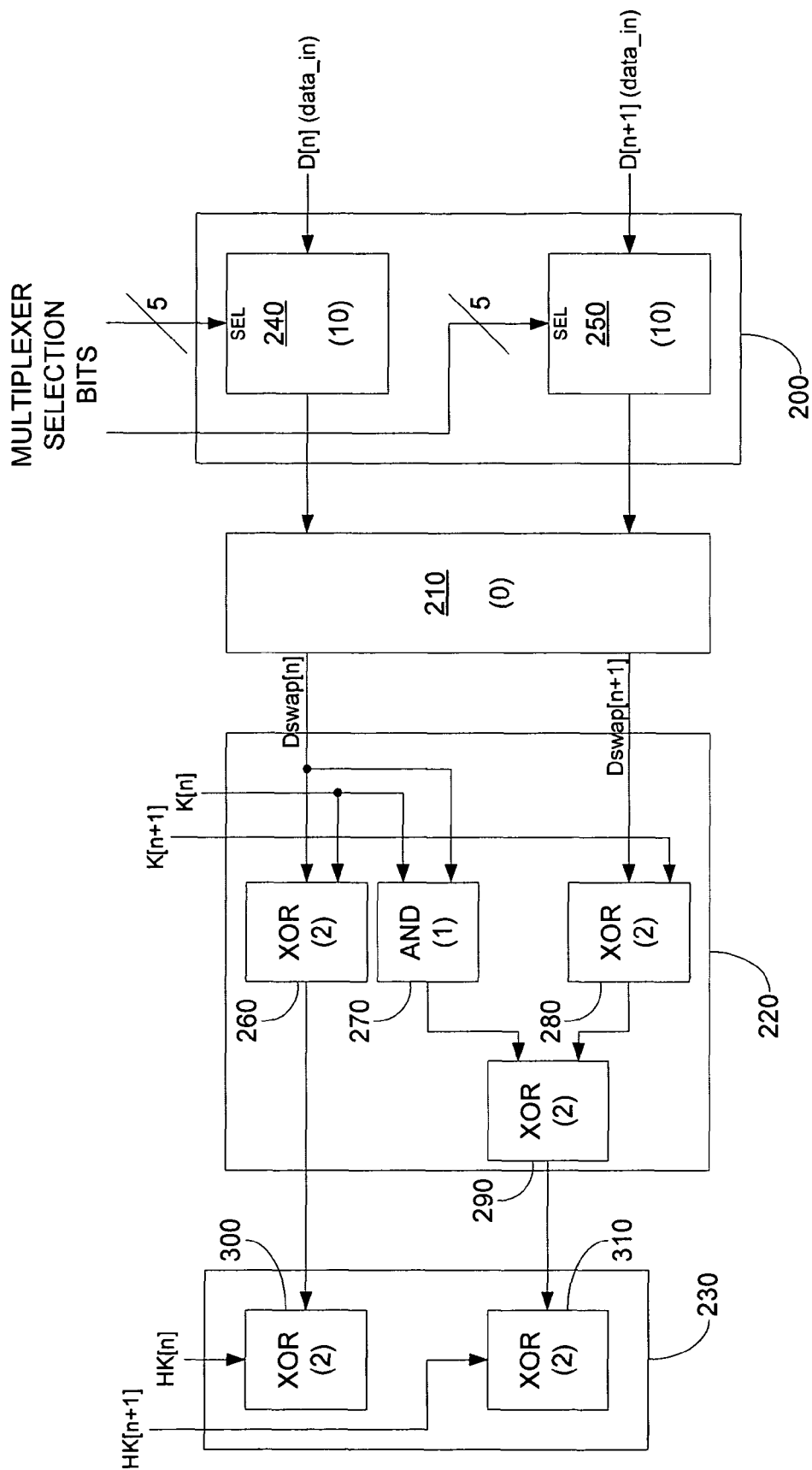
FIG. 4 shows a block diagram illustrating an embodiment of a portion of a decryption block according to the present invention.

FIG. 4 shows a block diagram illustrating an embodiment of a portion of a decryption block according to the present invention. FIG. 4 shows some of the components employed in a decryption block and, in particular, some of the components used for decrypting a pair of incoming bits (i.e., D[n] (data_in) and D[n+1] (data_in)). Clearly, the present invention contemplates decrypting more or less than two bits at a time and providing components to decrypt more or less than two bits at a time.

Some of the components of the decryption block may include, for example, the bit roller 200, the bit swapper 210, the adder 220 and the XOR block 230. The bit roller 200 may include, for example, a plurality of multiplexers including multiplexers 240 and 250. The multiplexers 240, 250 may be, for example, 32:1 multiplexers for use with 64-bit instruction words. Multiplexer selection bits may be input from the processor 190 and may provide the bit rolling as described above. The outputs of the multiplexers may be coupled to the bit swapper 210. The bit swapper 210 may swap bits using, for example, a fixed, hard-coded bit swapper. The output bits of the bit swapper 210 may be sent to the adder 220 which may employ, for example, one or more two-bit adders including XOR gates and AND gates.

As illustrated, the adder 220 includes a two-bit adder. A first output bit of the adder 220 may be a function of an XOR operation between a first output bit of the bit swapper, Dswap[n], and a first key bit of the shifted key, K[n]. The second output bit of the adder 220 may be a function of an XOR operation between (1) an AND operation between K[n] and Dswap[n] and (2) an XOR operation between a second output bit of the bit swapper, Dswap[n+1], and a second key bit of the shifted key, K[n+1].

The output bits of the adder 220 may be sent to the XOR block 230. The XOR block 230 may include, for example, a plurality of XOR gates including XOR gates 300, 310. The XOR gate 300 may perform an XOR operation between a first output bit of the adder 220 and the first bit of a hidden key, HK[n]. The second XOR gate 310 may perform an XOR operation between a second output bit of the adder 220 and the second bit of the a hidden key, HK[n+1]. The output bits of the XOR block 230 may then represent the decrypted data (e.g., original data or instructions).

FIG. 4 also illustrates approximately the number of gate delays per component in the decryption block according to an embodiment of the present invention. For example, the multiplexers 240, 250 may be 32:1 multiplexers with approximately 10 gate delays. The bit swapper 210 may be a fixed, hard-coded bit swapper and thus may have approximately 0 gate delays. The adder 220 may include, for example, a two-bit adder with, at most, approximately 4 gate delays. The XOR block 230 may include, for example, XOR gates 300, 310 with approximately 2 gate delays. Thus, the illustrated arrangement may have between approximately 14 gate delays to approximately 16 gate delays. Some embodiments according to the present invention may have between approximately 14 gate delays to approximately 20 gate delays. Various embodiments according to the present invention contemplate adjusting configurations or arrangements such that the operation of the decryption block does not exceed a particular clock cycle budget.

Some embodiments according to the present invention generate the multiplexer selection bits and the shifted key in parallel with the main decryption operations and register out the multiplexer selection bits and the shifted key so as not to contribute to the latency in the main pipeline path. In various embodiments according to the present invention, the only gate delays associated with the decryption operation may be the gate delays related to the incoming data as the incoming data passes through the decryption operation. In some embodiments, to process the address in parallel, the decryption operation may take place at least one cycle after the data is fed to the processor 100 from the memory 110.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for protecting data, comprising:
a memory in which encrypted data is stored; and
a processor coupled to the memory, the processor comprising a decryptor that decrypts the encrypted data, the decryptor being adapted to variably bit roll the encrypted data based on at least an original key, to fixedly bit shuffle the bit-rolled data, to add a first key to the bit-shuffled data and to process the added data with a second key,
wherein the decryptor receives the original key and the data address,
wherein the processor generates multiplexer selection bits and the first key, wherein the first key is a shifted version of the original key, wherein the shifting is based on at least the data address,
wherein the decryptor is adapted to variably bit roll the encrypted data by rotating bits within particular roll regions of encrypted data based on the multiplexer selection bits,
wherein the encrypted data is split into the particular roll regions,
wherein each roll region is characterized by the following characteristics: a respective roll skip, a respective roll length and a respective roll,
wherein each of the respective characteristics of the corresponding roll region is determined from different bits of the original key, and
wherein the respective roll skip determines where in the corresponding roll region to begin the roll and which portion of the roll region is not rolled, and
wherein the respective roll amount determines the number of bit positions that are rolled around a sub-region of the corresponding roll region defined by the roll length.

2. The system according to claim 1, wherein the decryptor is adapted to perform a single pipeline stage decryption.

3. The system according to claim 1, wherein the decryptor comprises a bit roller that rotates data in one or more roll regions of the incoming data based on the data address related to the received encrypted data and a key related to the first key.

4. The system according to claim 3, wherein the key comprises a shifted version of the first key.

5. The system according to claim 3, wherein the bit roller comprises a plurality of multiplexers.

6. The system according to claim 5,
wherein each multiplexer comprises a multiplexer selection input,
wherein multiplexer selection bits are input at the multiplexer selection input, and
wherein the multiplexer selection bits are generated based on the address related to the received encrypted data and the key related to the first key.

7. The system according to claim 1, wherein the decryptor comprises a fixed bit shuffler.

8. The system according to claim 7, wherein the fixed bit shuffler comprises a fixed, hard-coded bit shuffler.

9. The system according to claim 7, wherein the fixed bit shuffler does not add a gate delay to the decryptor.

10. The system according to claim 1, wherein the decryptor comprises one or more two-bit adders.

11. The system according to claim 10, wherein each two-bit adder comprises three exclusive OR (XOR) gates and an AND gate.

12. The system according to claim 1, wherein the decryptor comprises an XOR block.

13. The system according to claim 12, wherein the XOR block comprises one or more XOR gates.

14. The system according to claim 13, wherein each XOR gate comprises a first input and a second input, the first input receiving a bit of the second key, the second input receiving a bit of the added data.

15. The system according to claim 1, wherein the first key is a shifted version of a key.

16. The system according to claim 15, wherein an amount of shift in the first key is based on the data address related to the received encrypted data.

17. The system according to claim 15, wherein the first key is generated substantially in parallel with the decrypting of the encrypted data.

18. The system according to claim 1, wherein the decryptor does not add a latency to a processor pipeline.

19. The system according to claim 1, wherein the decryptor does not add enough gate delays to exceed a clock cycle budget of the processor.

20. The system according to claim 1, wherein the decryptor decrypts a word of the encrypted data in a single cycle.

21. The system according to claim 1, wherein the word comprises a 64-bit word.

22. The system according to claim 1, wherein the decryptor is adapted to receive encrypted data from the memory.

23. The system according to claim 1,
wherein memory and the processor are part of a set top box,
wherein the memory comprises a flash memory and an SDRAM,
wherein instructions are stored in the flash memory before being moved to the SDRAM for execution by the processor, and
wherein the instructions stored in the flash memory are compressed before being moved to the SDRAM for execution by the processor.

24. The system according to claim 1, wherein the processor uses a single pipeline stage decryption algorithm.

25. The system according to claim 1, wherein encrypted data stored in the memory has been encrypted using an encryption algorithm that varies periodically at address multiples such that repeated instructions are not encoded in the same way each time.

26. The system according to claim 1,
wherein the encrypted data stored in the memory is encrypted in a single clock cycle encryption scheme, and
wherein the processor decrypts the encrypted data in a single clock cycle decryption scheme.

27. The system according to claim 1,
wherein the memory and the processor are part of a set top box, and
wherein the processor that fixedly bit shuffles the bit-rolled data is configured as a fixed, hard-coded bit shuffler in which the fixed, hard-coded bit shuffling differs according to a class of the set top box such that different classes of set top boxes differ in their fixed, hard-coded bit shuffling.

28. The system according to claim 1,
wherein the memory and the processor are part of a device, and
wherein the processor that fixedly bit shuffles the bit-rolled data is configured as a fixed, hard-coded bit shuffler in which the fixed, hard-coded bit shuffling differs according to device class such that different classes of devices differ in their fixed, hard-coded bit shuffling.

29. The system according to claim 1,
wherein the decryptor comprises a series of two-bit adders that process incoming data bits, and
wherein values input to the series of two-bit adders relate to processing of first key and the data address.

30. The system according to claim 1,
wherein the decryptor comprises a bit swapper and a bit roller,
wherein the bit swapper is configured to provide fixed, hard-coded bit shuffling,
wherein the bit roller is configured to provide variable bit rolling,
wherein the decryptor comprises a plurality of two-bit adders,
wherein each two-bit adder receives two bits from a bit swapper that received two bits from the bit roller, and
wherein each two-bit adder receives two bits of the first key.

31. The system according to claim 1,
wherein a particular two-bit adder of the plurality of two-bit adders receives a different two bits of the first key based on different data addresses received by the processor.

32. The system according to claim 1,
wherein each two-bit adder outputs two bits that are received in an XOR block, and
wherein the XOR block receives two bits of the second key.

33. The system according to claim 32, wherein an output of the XOR block is decrypted data.

34. The system according to claim 33, wherein the decrypted data is stored in an internal memory of the processor.

35. The system according to claim 1, wherein the second key is unrelated to the first key.

36. The system according to claim 1, wherein a portion of the first key.

37. The system according to claim 35,
wherein the decryptor comprises a bit swapper that swaps bits output from the variable bit roller, and
wherein the decryptor comprises an adder that adds the shifted key to bits output from the bit swapper.

38. The system according to claim 35,
wherein the decryptor comprises an XOR block that processes bits output from the adder and bits from a hidden key that is unrelated to the shifted key, and
wherein bits output from the XOR block are decrypted.

39. The system according to claim 1,
wherein the encrypted data is partitioned into a plurality of roll regions, the roll regions being of variable length,
wherein each roll region is characterized by a roll skip, a roll region length and a roll amount,
wherein the roll skip, the roll region length and the roll amount are set through bits of a portion of the original key, and wherein the bits of the portion of the original key, selected based on the data address, are used to set the roll skip, the roll region length and the roll amount.

40. The system according to claim 1, wherein the bits of the portion of the original key used to set the roll skip, the roll region length and the roll amount are set using the bits of the portion of the original key which change as the data address changes.

* * * * *